United States Patent
Kouno

[19]
[11] Patent Number: 5,947,224
[45] Date of Patent: *Sep. 7, 1999

[54] FOUR-WHEEL DRIVE CONTROL SYSTEM FOR VEHICLE

[75] Inventor: Kazuyuki Kouno, Sagamihara, Japan

[73] Assignee: Nissan Motor Co., Ltd., Yokohama, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/731,741

[22] Filed: Oct. 18, 1996

[30] Foreign Application Priority Data

Oct. 19, 1995 [JP] Japan .................................... 7-271112

[51] Int. Cl.$^6$ .................................................. B60K 17/34
[52] U.S. Cl. .............................. 180/248; 180/233; 701/89
[58] Field of Search ...................... 701/89, 82; 180/233, 180/248, 197, 249, 247

[56] References Cited

U.S. PATENT DOCUMENTS

| | | | |
|---|---|---|---|
| 4,762,213 | 8/1988 | Watanabe | 180/233 |
| 4,763,912 | 8/1988 | Matsuda | 180/233 |
| 4,773,500 | 9/1988 | Naito et al. | 180/233 |
| 4,866,625 | 9/1989 | Kawamoto et al. | 180/233 |
| 4,895,217 | 1/1990 | Hueckler et al. | 180/233 |
| 5,010,974 | 4/1991 | Matsuda | 180/233 |
| 5,418,725 | 5/1995 | Eto | 180/248 |
| 5,448,478 | 9/1995 | Eto | 180/233 |
| 5,485,894 | 1/1996 | Watson et al. | 180/233 |
| 5,599,075 | 2/1997 | Hara et al. | 303/143 |
| 5,701,247 | 12/1997 | Sasaki | 701/89 |
| 5,752,211 | 5/1998 | Takasaki et al. | 180/233 |
| 5,754,970 | 5/1998 | Takasaki et al. | 701/87 |
| 5,803,197 | 9/1998 | Hara et al. | 180/248 |
| 5,819,194 | 10/1998 | Hara et al. | 701/89 |
| 5,839,084 | 11/1998 | Takasaki et al. | 701/67 |
| 5,875,865 | 3/1999 | Wakahara et al. | 180/248 |

FOREIGN PATENT DOCUMENTS

| | | |
|---|---|---|
| 56-138020 | 10/1981 | Japan . |
| 1-204826 | 8/1989 | Japan . |

*Primary Examiner*—Daniel G. DePumpo
*Attorney, Agent, or Firm*—Foley & Lardner

[57] ABSTRACT

A four-wheel drive control system for an automotive vehicle equipped with a transfer including a friction clutch for distributing a driving force to rear wheels and front wheels under a control of an engaging force of the friction clutch. The four-wheel drive control system comprises a driving force distribution control system which is arranges to (a) set first driving force distributed amounts respectively to the rear and front wheels in accordance with a detected value of a rotational speed difference between the rear and front wheels in a manner that a driving force to be applied to the front wheels increases with an increase in the detected value of the rotational speed difference, (b) set second driving force distributed amounts respectively to the rear and front wheels in accordance with a detected value of a throttle opening degree when the judgment is made such that the vehicle is at starting, and (c) control the engaging force of the friction clutch of the driving force distribution adjusting device in accordance with the first and second driving force distributed amounts. Additionally, the driving force distribution control system includes a second driving force distributed amounts adjusting device for setting smaller the driving force distributed amount of the second driving force distributed amounts to the front wheels when the rotational speed of the front wheels is over that of the rear wheels, than that set when the rotational speed of the rear wheel is over that of the front wheels, at the starting of the vehicle.

7 Claims, 5 Drawing Sheets

FOUR-WHEEL DRIVE CONTROL SYSTEM FOR VEHICLE

BACKGROUND OF THE INVENTION

1. Field of the Invention

This invention relates to improvements in a four-wheel drive control system for a vehicle (automotive vehicle), and more particularly to such a system arranged to control driving forces to be distributed to front and rear wheels under control of the engaging force of a friction clutch mechanism in accordance with a rotational speed difference developed between the front and rear wheels of the vehicle.

2. Description of the Prior Art

Hitherto a variety of four-wheel drive control systems for an automotive vehicle have been proposed and put into practical use. A typical one is arranged as follows: One of front and rear (road) wheels serve as main driving wheels and others as auxiliary driving wheels. During a normal operating condition of the vehicle, whole engine power output or the greater part of the engine power output is transmitted as a "driving force" to the main driving wheels; and the driving force is distributed also to the auxiliary driving wheel under a condition where the driving force to the main driving wheel is excessive. The "driving force" transmitted to the wheels is exactly a driving torque and therefore different from a driving force which kicks a road surface and moves the vehicle; however, forces (including the driving torque) for moving the vehicle are generally referred hereinafter to as the driving force.

In this four-wheel drive control system, a friction clutch is interposed between a main propeller shaft of the main driving wheels and an auxiliary propeller shaft of the auxiliary drive wheels. More specifically, the friction clutch is interposed between the output shaft of a transmission and the auxiliary propeller shaft. A condition where the driving force to the main driving wheel is excessive is detected in accordance with the rotational speed difference between the main and auxiliary driving wheels, upon which it is recognized that the driving force to the main driving wheels is more excessive as this rotational speed difference is larger. Accordingly, the ratio of the driving force distributed amounts to the main and auxiliary driving wheels is set so that the driving force to the auxiliary driving wheel increases as the rotational speed difference increases. This four-wheel drive control system is provided with the friction clutch interposed between the transmission output shaft and the auxiliary propeller shaft, and therefore the engaging force of the friction clutch is increased as the driving force distributed amount to the auxiliary driving wheel increases.

In the vehicle provided with the above conventional four-wheel drive control system, a so-called driving force distribution feedforward control has been proposed. This control is referred hereinafter to as a "first conventional technique" and arranged as follows: A condition where slippage of the main driving wheel tends to occur has been previously detected in accordance with a depression amount (referred hereinafter to also as a "throttle opening degree") of an accelerator pedal or the like. Upon this, the ratio of the driving force distributed amounts to the main and auxiliary driving wheels is set to increase the driving force to be transmitted to the auxiliary driving wheels as the throttle opening degree increases at the starting of the vehicle, before the occurrence or increase of the slippage of the main driving wheels.

However, with the above first conventional technique, when the vehicle makes a turning-running (the vehicle runs while turning) immediately after its starting, the engaging force of the friction clutch is too high, and therefore it is impossible to absorb the rotational speed difference developed between the front and rear wheels, so that a tight corner brake phenomena (a brake is applied to the vehicle under the action of an interlock due to the rotational speed difference between the front-and rear wheels) tends to occur.

In view of this, a technique (referred hereinafter to as a "second conventional technique") disclosed in Japanese Patent Provisional Publication No. 56-138020 is known as the technique to prevent the tight corner brake phenomena from occurring even if the vehicle makes the turning immediately after the starting of the vehicle. According to this second conventional technique, the driving force (distributed amount) to the auxiliary driving wheels is set at zero when the rotational speed difference between the front and rear wheels increases over a predetermined level, so that the vehicle is put into a two-wheel driving condition.

However, the above-mentioned condition where the rotational speed difference between the front and rear wheels increases over the predetermined level can be established not only in the case that the front wheel rotational speed is over the rear wheel rotational speed when the tight corner brake phenomena occurs, but also in a case that the rotational speed of the main driving wheels is over that of the auxiliary driving wheels when the vehicle makes the starting on a low $\mu$ road surface. Thus, the second conventional technique makes a control upon judging only the magnitude of the rotational speed difference between the front and rear wheels. As a result, the vehicle tends to take the two-wheel driving condition during the starting on the low $\mu$ road surface, and therefore the main driving wheels tend to be put into a slippage condition, thereby providing problems in starting characteristics of the vehicle.

SUMMARY OF THE INVENTION

It is an object of the present invention to provide an improved four-wheel drive control system for a vehicle, which can effectively overcome drawbacks encountered in conventional techniques for the four-wheel drive control systems.

Another object of the present invention is to provide an improved four-wheel drive control system for a vehicle, which can prevent a slippage of the main driving wheels from occurring at the starting on a low $\mu$ road surface and a steep slope, while preventing the tight corner brake phenomena from occurring when the vehicle turns (upon running) immediately after the starting on a high $\mu$ road surface.

A four-wheel drive control system of the present invention is for a vehicle having main driving wheels and auxiliary driving wheels, in which the main driving wheels are one of front and rear wheels, and the auxiliary driving wheels are the other of rear and front wheels. The control system comprises a driving force distribution adjusting device including a friction clutch for distributing a driving force to the main driving wheels and the auxiliary driving wheels under a control of an engaging force of the friction clutch. A rotational speed difference detecting device is provided to detect a difference in rotational speed between the main driving wheels and the auxiliary driving wheels. A throttle opening degree detecting device is provided to detect a throttle opening degree. A vehicle running condition judging device is provided to judge starting of the vehicle. A driving force distribution control system is provided to (a) set first driving force distributed amounts respectively to the main and auxiliary driving wheels in accordance with a detected value of the rotational speed difference detected by the rotational speed difference detecting device, in a manner that a driving force to be applied to the auxiliary driving wheels increases with an increase in the detected value of the rotational speed difference, (b) set second driving force distributed amounts respectively to the main and auxiliary driving wheels in accordance with a detected value of the throttle opening degree detected by the throttle opening degree detecting device when the judgment is made such that the vehicle is at the starting by the vehicle running condition judging device, and (c) control the engaging force of the friction clutch of the driving force distribution adjusting device in accordance with the first and second driving force distributed amounts. Additionally, the driving force distribution control system includes a second driving force distributed amounts adjusting device for setting smaller the driving force distributed amount of the second driving force distributed amounts to the auxiliary driving wheel when the rotational speed of the front wheels is over that of the rear wheels, than that set when the rotational speed of the rear wheel is over that of the front wheels, at the starting of the vehicle detected by the vehicle running condition judging device.

According to the four-wheel drive control system of the present invention, in case that the vehicle makes its turning-running (the vehicle makes simultaneously its turning and running) immediately after its starting (for example, a the vehicle speed not higher than 20 km/h) on a high $\mu$ road. surface, the second driving force distributed amount adjusting device judges the fact that the rotational speed of the front wheels of the vehicle is over that of the rear wheels, and sets smaller the driving force distributed amount (set according to the detected value of the throttle opening degree) of the second driving force distributed amounts to be applied to the auxiliary driving wheels, than that set when the rotational speed of the rear wheels is over that of the front wheels. As a result, the engaging force of the friction clutch is controlled to such an extent as to absorb the rotational speed difference developed between the front and rear wheels, thereby preventing the tight corner brake phenomena from occurring.

Additionally, when the vehicle starts on the low $\mu$ road surface, the driving force distributed amount to the auxiliary wheels is set according to the feedforward control based on the detected value of the throttle opening degree detected by the throttle opening degree detecting device. The driving force distribution adjusting device accomplishes the driving force distribution to the auxiliary driving wheels at a high response under the action of the friction clutch. This effectively suppresses occurrence of slippage of the main driving wheels.

When the vehicle runs, for example, at a normal speed (for example, a vehicle speed over 20 km/h), an engine brake is applied on a low $\mu$ road surface of a downhill, so that the front wheel rotational speed of the vehicle is over the rear wheel rotational speed owing to a locked wheel or a locked wheel tendency in the rear wheels. However, under the action of the second driving force distributed amounts adjusting device of the present invention, the driving force distributed amount to the auxiliary driving wheels are set at zero only at the starting of the vehicle, thereby never affecting the driving force distribution control under a normal running condition of the vehicle.

DETAILED DESCRIPTION OF THE INVENTION

Figure 1:
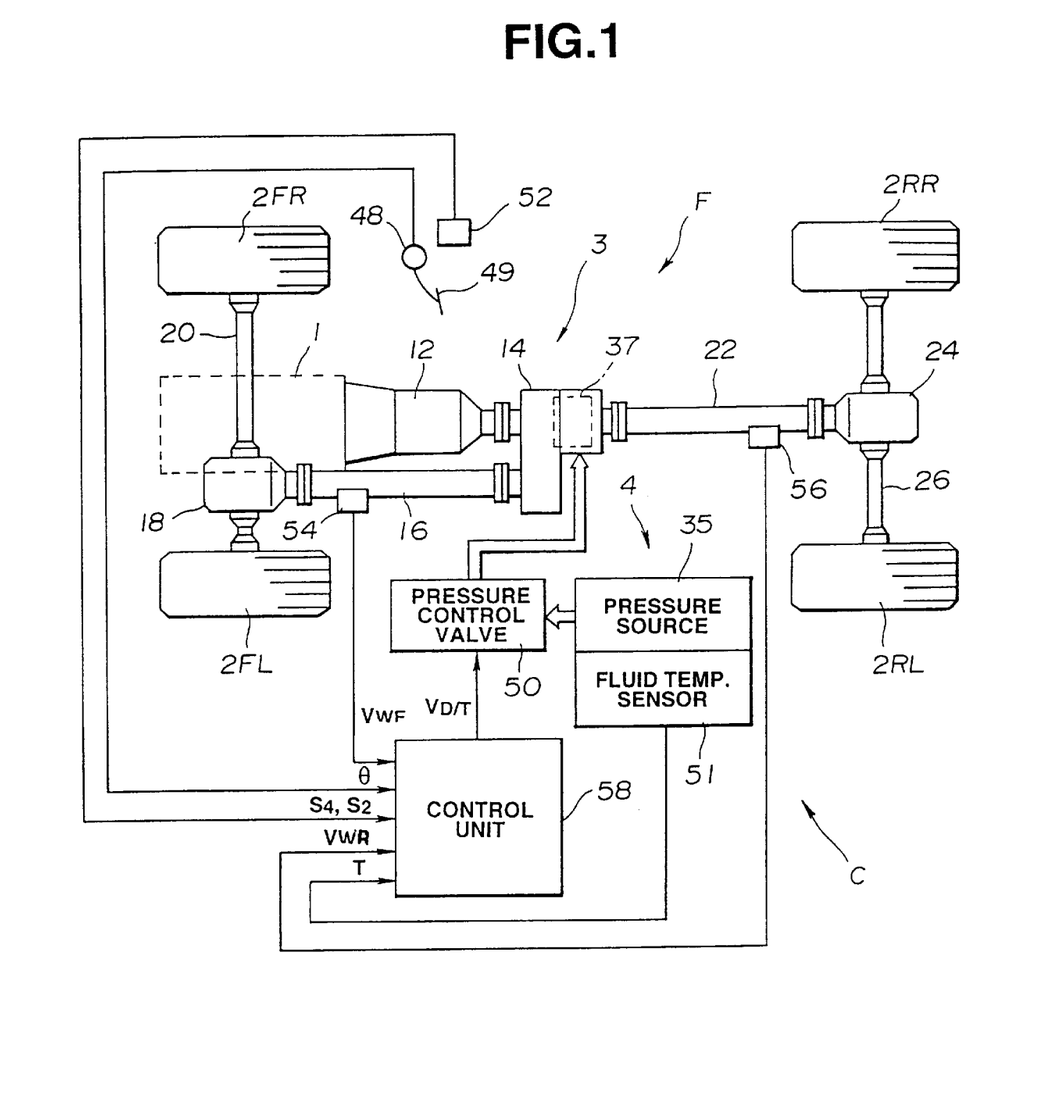
FIG. 1 is a schematic illustration of an automotive vehicle arrangement including an embodiment of a four-wheel drive control system according to the present invention.
Figure 2:
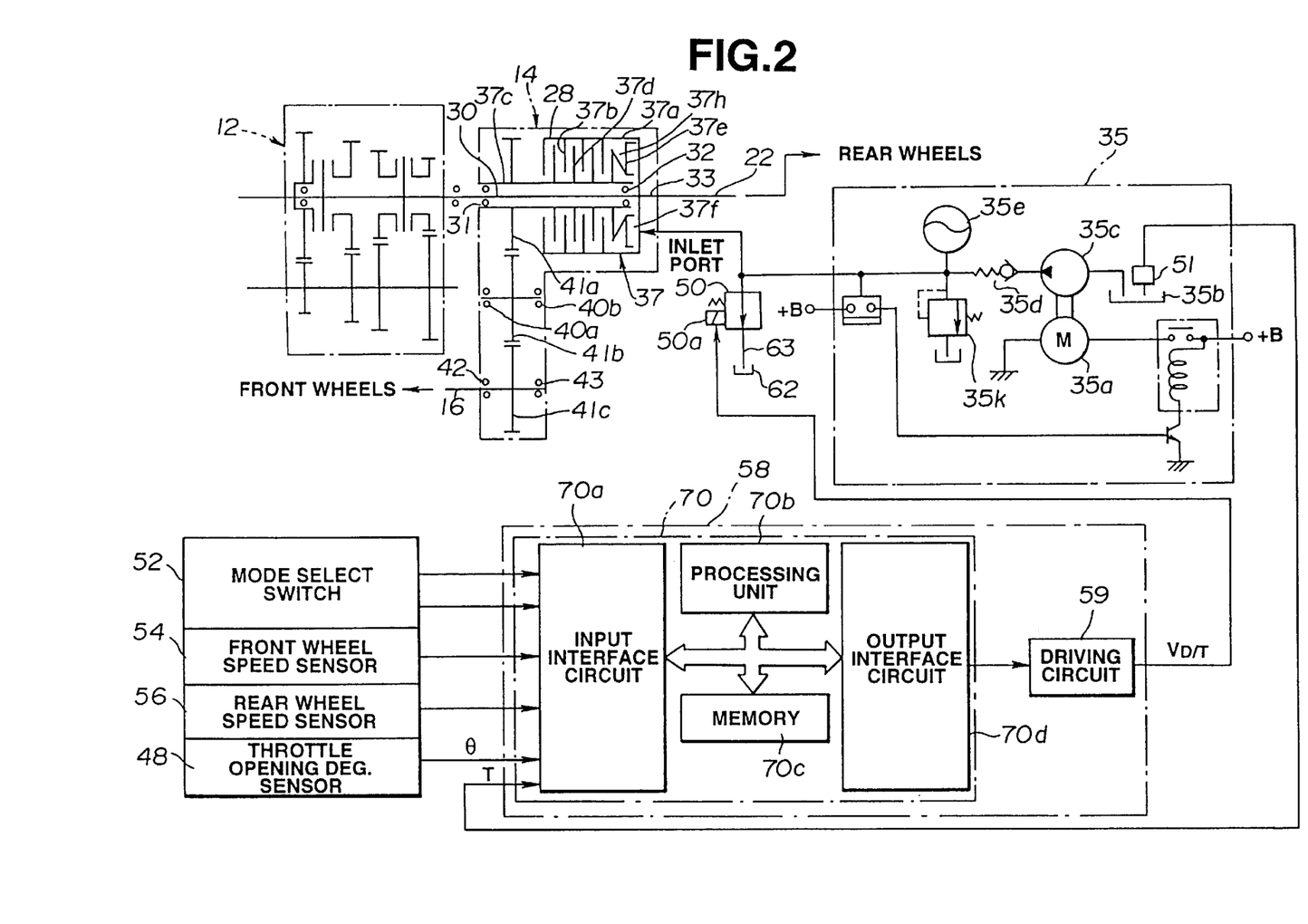
FIG. 2 is a schematic illustration of a driving force distribution control system forming part of the four-wheel drive control system of FIG. 1.

Referring now to FIGS. 1 and 2, a four-wheel drive control system according to the present invention is illustrated by the reference numeral C. The four-wheel drive control system C of this embodiment is for a four-wheel drive vehicle F and includes a driving force distribution control system 4 including a transfer (transfer clutch) 14. The four-wheel drive vehicle F is based on a so-called FR (front engine rear wheel drive) type vehicle.

The four-wheel drive vehicle F includes an internal combustion engine 1 as a driving source. The vehicle F has front left-side and right-side (road) wheels 2FL, 2FR, and rear left-side and right-side (road) wheels 2RL, 2RR. A driving force transmitting system 3 is provided between the engine 1 and the wheels 2FL, 2FR, 2RL, 2RR to be able to change a driving force distribution ratio (ratio of driving force distributed amounts) to the respective wheels 2FL, 2FR, 2RL, 2RR. The driving force transmitting system 3 is operatively connected to the driving force distribution control system 4 for controlling operation of the driving force transmitting system 3.

The driving force transmission system 3 includes a clutch (not shown) which can interrupt transmission of power output from the engine to a transmission 12 which is arranged to change a rotational speed of a rotatory shaft (not shown) connected to the clutch, at a selected gear ratio. The transmission 12 is connected to the transfer (transfer case) 14 which is arranged to distribute a driving force from the transmission 12 to the front wheels (auxiliary drive wheels) 2FL, 2FR and to the rear road wheels 2RL, 2RR. The driving force distributed for the front wheels 2FL, 2FR is transmitted as a front wheel-side driving force to the front wheels 2FL, 2FR through a front-side power output shaft 16, a front differential 18 and a front wheel-side drive shaft 20. The driving force distributed for the rear wheels 2RL, 2RR is transmitted as a rear wheel-side driving force to the rear wheels 2RL, 2RR through a propeller shaft (rear wheel-side power output shaft) 22, a rear differential 24 and a rear wheel-side drive shaft 26.

As shown in FIG. 2, the transfer 14 includes a case 28. A power input shaft 30 is disposed to pass through the case 28 and has a left-side end section (in FIG. 2) which is connected to a power output shaft (not identified) of the transmission 12. The power input shaft 30 is pivotally and rotatably supported by bearings 31 and the like. The right-side end section (in FIG. 2) of the power input shaft 30 is connected to a power output shaft 33 which is pivotally and rotatably supported by bearings 32. This power output shaft 33 is connected to the propeller shaft 22. The detailed structure of this transfer (transfer clutch) 14 is discussed, for example, in Japanese Patent Provisional Publication No. 1-204826.

The transfer 14 includes a fluid-type multiple disc clutch mechanism 37 as a variable torque clutch is disposed around a central section of the input shaft 30 to change the torque distribution ratio to the front and rear wheels. This clutch mechanism 37 includes a clutch drum 37a which is spline-connected to the input shaft 30. Friction plates 37b are engaged with the clutch drum 37a to extend in a rotational direction of the clutch drum 37a. A clutch hub 37c is pivotally rotatably mounted through a needle bearing and the like on the outer peripheral surface of the input shaft 30. Friction discs 37d are engaged with the clutch hub 37c to extend in a rotational direction of the clutch hub 37c. A clutch piston 37e is disposed at the right-side (in FIG. 2) of the clutch mechanism 37. A cylinder chamber 37f is formed between the clutch piston 37e and the clutch drum 37a. A return spring 37h is disposed to bias the clutch piston plate 37e. This clutch mechanism 37 is connected also to the front wheels through a gear train (not identified) installed to the left-side end section of the transfer 14 in FIG. 2. In other words, the clutch hub 37c is spline-connected to a first gear 41a which is engaged with a second gear 41b which is rotatable under the action of bearings 40a, 40b. The second-gear 41b is connected to the front-side power output shaft 16 through the third gear 41c which is rotatable under the action of bearings 42, 43.

The case 28 of the transfer 14 is formed at a predetermined position of the side surface with an inlet port through which a hydraulic (operating) fluid from a pressured control valve 50 forming part of the driving force distributed amount control system 4 is supplied as a control force (pressure) to the cylinder chamber 37f. Accordingly, in a condition that no hydraulic fluid pressure is supplied to the inlet port, i.e., that the pressure in the cylinder chamber 37f of the clutch mechanism 37 is equal or generally equal to the atmospheric pressure, the friction plates 37b and the friction discs 37d are separate from each other, and therefore all the input torque transmitted to the input shaft 30 is transmitted to the side of the rear wheels so that the vehicle is put into a two-wheel driving condition. In a condition that the hydraulic fluid pressure is supplied to the inlet port, the clutch piston 37e produces a biasing force in accordance with the magnitude of the hydraulic fluid pressure to be supplied to the cylinder chamber 37f. Under this biasing force, an engaging (fastening) force due to a friction force is developed between each friction plate 37b and each friction discs 37d, so that a part of the whole driving torque is transmitted also through the output shaft 16 to the front wheels. The torque ΔT transmitted to the front wheels increases linearly relative to a hydraulic fluid pressure P to be supplied to the cylinder chamber 37f as shown in Eq. (1).

$$\Delta T = P \cdot S \cdot 2n \cdot \mu \cdot r_m \qquad \text{Eq. (1)}$$

where S is an area of the piston 37e to which the hydraulic fluid pressure is applied; n is the number of the friction disc 37d; $\mu$ is the coefficient of friction of the friction disc; and $r_m$ is the torque transmission effective radius of the friction disc.

More specifically, the transmitted torque ΔT to the front wheels is proportional to the supplied hydraulic fluid pressure, and therefore the driving torque is distributed and transmitted to the rear wheels side and the front wheels side in accordance with the fastening force applied between the friction plates 37b and the friction discs 37d. The ratio (distribution ratio) of the torque or driving force to be distributed to the front wheels and the rear wheels is continuously changed (within a range of from 0:10 to 50:50) in accordance with the pressure P to be supplied to the inlet port of the case 28 of the transfer 14.

Turning to FIG. 1, the driving force distribution control system 4 includes a hydraulic fluid pressure source 35 for pressurizing the hydraulic fluid within a reservoir 35b. The pressure source 35 is fluidly connected to the pressure control valve 50 which is in turn fluidly connected to the cylinder chamber 37f of the clutch mechanism 37 of the transfer 14 so as to variably control the hydraulic fluid pressure to be supplied to the inlet port of the clutch mechanism 37 from the pressure source 35. The pressure control valve 50 forms part of a fluid pressure control system (no numeral) of the driving force distribution control system 4. A front wheel speed sensor 54 is provided to detect a rotational speed VWf of the front wheels and output a detection signal representative of the detected rotational speed. A rear wheel speed sensor 54 is provided to detect a rotational speed VWR of the rear wheels and output a detection signal representative of the detected rotational speed. A throttle opening degree sensor 48 is provided to detect a throttle opening degree θ on the basis of a depressed amount of an accelerator pedal 49 and output a detection signal representative of the detected throttle opening-degree. A mode select switch 52 is provided to be arranged such that a driver of the vehicle can select an operational mode corresponding to the distribution ratio of the driving torque or force and output a signal representative of the operational mode. A fluid temperature sensor 51 is provided to detect a temperature T of the hydraulic fluid within the reservoir 35b. A control unit 58 is provided to control the pressure control valve 50 so as to regulate the hydraulic pressure to be output from the pressure control valve 50 in accordance with the detection signals from the above-discussed various sensors and other signals.

As shown in FIG. 2, the hydraulic fluid pressure source 35 includes a pump 35c which is rotatingly driven by an electric motor 35a so as to pressurize the hydraulic fluid within the reservoir 35b and supply it to the inlet port of the clutch mechanism 37. A check valve 35d is disposed at the discharge side of the pump 35c. An accumulator 35e is disposed in a line between the check valve 35d and the inlet port of the clutch mechanism 37. A relief valve 35k is connected to a point of the line to which point the accumulator 35e is connected. The pressure control valve 50 is disposed in a drain piping 63 which is branched off from a line between the inlet port of the clutch mechanism 37 and the point to which the accumulator 35e is connected.

Figure 3:
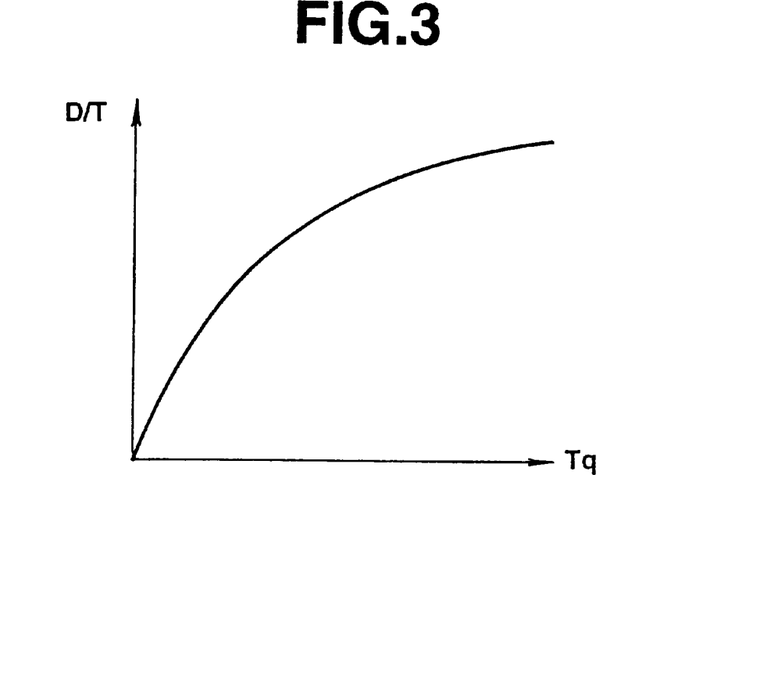
FIG. 3 is a graph showing the relationship between the duty ratio and the target front wheel distributed torque, used in the driving force distribution control system of FIG. 2.

The pressure control valve 50 is a normally-opened pressure-reduction valve of a so-called duty ratio proportional type and has a spool (not shown) which is movable to set an opening degree. The pressure control valve 50 is arranged such that the opening degree of the spool is set in accordance with a voltage signal $V_D/T$ (corresponding to a duty ratio) to be supplied to a solenoid 50a of the pressure control valve 50 under a so-called PWM (Pulse Width Modulation) control. As the duty ratio in the voltage signal $V_D/T$ increases, a controlled pressure Pc (at the primary side of the control valve 50) to be supplied to the clutch mechanism 37 increases. Here, the engaging force of the clutch mechanism 37 linearly changes relative the controlled pressure Pc to be supplied to the clutch mechanism 37, and the driving force to be transmitted to the front wheels linearly changes relative to the engaging force of the clutch mechanism 37. As a result, a driving force distributed amount (for example, 0 to 115 kgm=a half of whole driving force) Tq to be supplied to the front wheel side under the PWM control simply increases as a curve of secondary degree relative to the above-mentioned duty ratio D/T as shown in FIG. 3.

The front wheel speed sensor 54 and the rear wheel speed sensor 56 are separately installed respectively at predetermined positions of the front wheel side power output shaft 16 and the rear wheel side propeller shaft 22. Each wheel speed sensor 54, 56 optically or electromagnetically detect the rotational speed of the corresponding shaft and output the detection signal in the form of pulse signal or sine wave signal. The detection signal (from the front wheel speed sensor 54) representative of the front wheel speed VWf and the detection signal (from the rear wheel speed sensor 56) representative of the rear wheel speed VWR are respectively separately output to the control unit 58.

The above-mentioned mode select switch 52 is disposed near a driver'eat, for example, in an instrument panel (not shown). The mode select-switch 52 is arranged as follows: For example, when the driver desires and makes a switching action to select a two-wheel driving mode in which the driving force from the engine 1 is to be transmitted only to the rear wheels 2RL, 2RR as the main driving wheels, a two-wheel driving mode select signal S2 (corresponding to a logic signal "1" representing a "ON" state) is output. When the driver desires and makes a switching action to select a four-wheel driving mode in which the ratio of the driving force distributed amounts to front and rear wheels are to be automatically controlled within a range of from 0:100 to 50:50, a four-wheel automatic driving mode select signal S4 (corresponding to a logic signal "1" representing a "ON" state) is output. When the logic signal "1" representing the ON state for one of the above-mentioned two mode select signals is output, a logic signal "0" representing an OFF state for the other of the above-mentioned two mode select signals is output. The above-mentioned throttle opening degree sensor 48 includes a positioner (not shown) for detecting the throttle opening degree which is obtained as an accelerator operation amount (the amount of depression of the accelerator pedal). More specifically, the throttle opening degree is set at 0% when the accelerator operation amount is zero, while the throttle opening degree is set at 100% when the accelerator pedal is depressed to a depression limit. The throttle opening degree θ is represented by a throttle opening degree signal which gradually increases in voltage from the throttle opening degree signal representing the throttle opening degree of 0% to the throttle opening degree signal representing the throttle opening degree of 100%, in accordance with the depression amount of the accelerator pedal. The throttle opening degree (θ0) signal is output to the control unit 58.

The control unit 58 includes a microcomputer 70 and a driving circuit 59 for driving the above-mentioned pressure control valve 50. The microcomputer 70 includes an input interface circuit 70a (having a A/D converting function) for reading the detection signals from the respective sensors and the switch, as detection values. The microcomputer 70 further includes a processing unit 70b, a memory 70c including a ROM, a RAM and the like, and an output interface circuit 70d (having a D/A converting function) for outputting a clutch engaging force control signal ST representing a clutch engaging force obtained by the processing unit 70b. The microcomputer 70 in this embodiment is arranged as follows: According to processing program of FIG. 4 which will be discussed after, a first front wheel distributed torque (first torque to be distributed to the front wheels) Tq1 is calculated from a deviation ΔVW between the above-mentioned front and rear wheel speeds VWF, VWR. A second front wheel distributed torque (second torque to be distributed to the front wheels) Tq2 is calculated from the above-mentioned fluid temperature T. A third front wheel distributed torque (third torque to be distributed to the front wheels) Tq3 is calculated. Then, a standard front wheel distributed torque (standard torque to be distributed to the front wheels) TB is calculated from the maximum value of the first, second and third front wheel distributed torques. The standard front wheel distributed torque TB may be set as a target front wheel distributed torque Tq upon taking account of the mode select signal S4, S2. The target front wheel distributed torque Tq is output as the control signal ST to the driving circuit 59.

The driving circuit 59 is arranged as follows: The duty ratio D/T of the solenoid 50a of the pressure control valve 50 is set according to a characteristic curve of FIG. 3, to attain the target front wheel distributed torque as the control signal ST output from the microcomputer 70. The driving circuit 59 in this embodiment includes a so-called PWM (Pulse Width Modulation) driving circuit containing a standard wave generating circuit, a comparator and the like though not shown, in order to output the command voltage signal $V_D/T$ as a driving signal representing the duty ratio D/T.

Next, a manner of operation of the four-wheel driving control system C of this embodiment will be discussed hereinafter with reference to the flow chart of FIG. 4. The operation is controlled under the action of the processing program executed by the control unit 58 in accordance with the flow chart of FIG. 4. The processing program is executed as a timer interruption at time-intervals of a predetermined sampling time ΔT (for example, 10 msec) by the microcomputer 70. While the flowchart of FIG. 4 is not provided with steps for communication in the microcomputer 70, it will be understood that maps, programs and predetermined calculation formulae necessary for processing of the flowchart of FIG. 4 is read from the ROM of the above-mentioned memory, and calculated values and respective information values obtained by the processing are stored in the RAM of the memory 70c.

Figure 4:
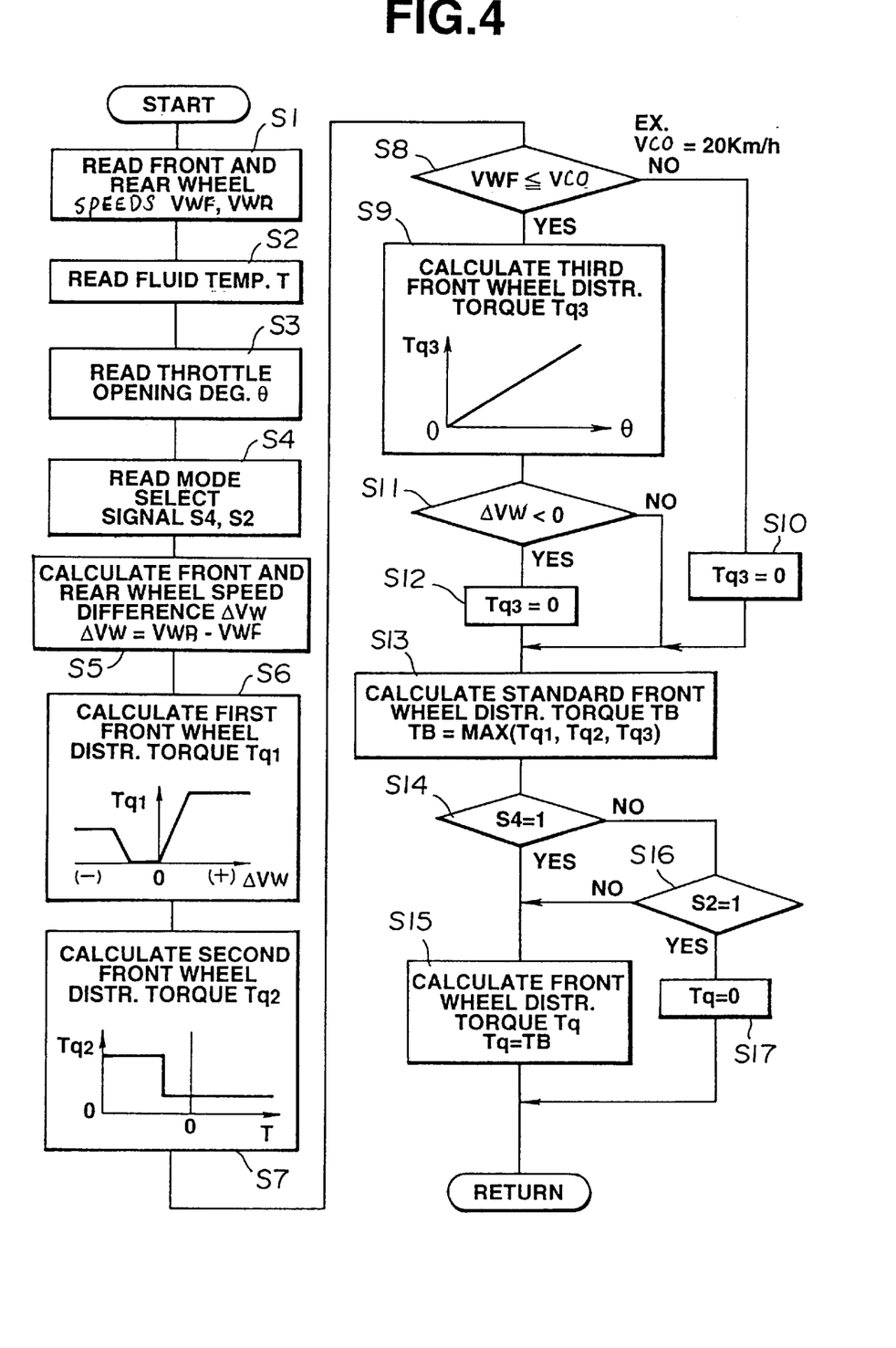
FIG. 4 is a flowchart of a processing program used for controlling the driving force distribution control system of FIG. 2.

In the processing program of FIG. 4, at a step S1, the front wheel speed VWF from the front wheel speed sensor 54 and the rear wheel speed VWR from the rear wheel sensor 56 are read.

Then, the program goes to a step S2 at which the fluid temperature T is read from the fluid temperature sensor 51. At a step S3, the throttle opening degree θ is read from the throttle opening degree sensor 48. At a step S4, the mode select signals S4, S2 are read from the mode select switch 52. The program then goes to a step S5 at which a front and rear wheel speed difference (difference between the front and rear wheel speeds) ΔVW is calculated according to the following Eq. (2) using the front wheel speed VWF and the rear wheel speed VWR:

$$DVM = VMR - VWF \qquad \text{Eq. (2)}$$

Figure 5:
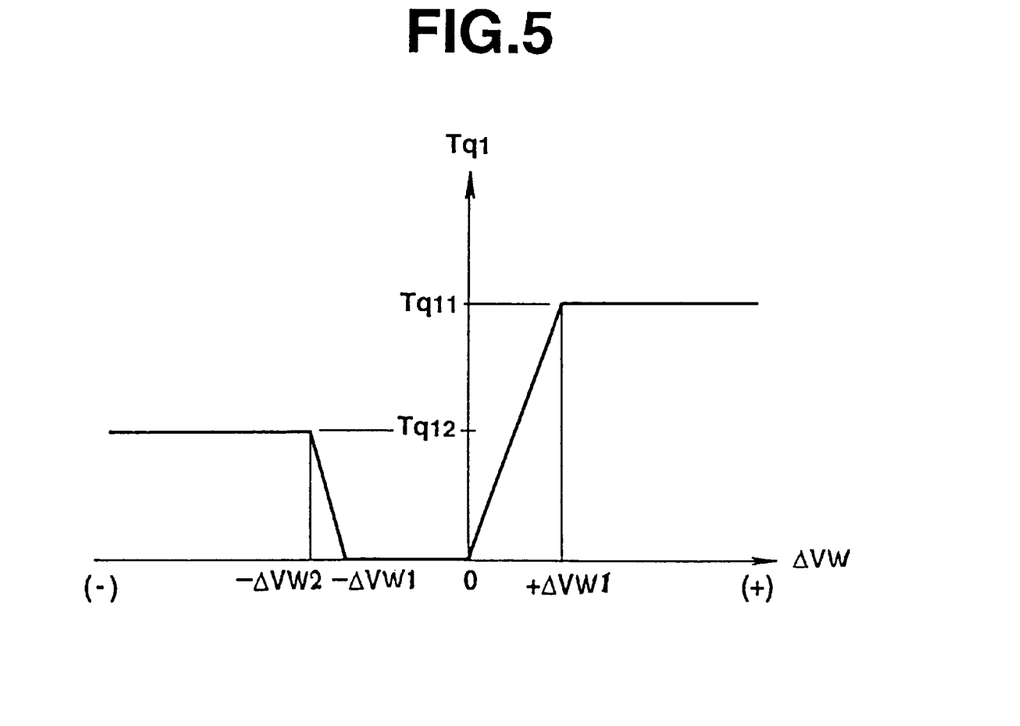
FIG. 5 is a graph of a control map for calculating and setting a first front wheel distributed torque used in the processing program of FIG. 4.

Next, the program goes to a step S6 at which the first front distributed torque Tq1 is calculated from the control map shown in FIG. 5 by using the front and rear wheel speed difference ΔVW. According to this map of FIG. 5, the first front wheel distributed torque Tq1 is maintained at a relatively high predetermined value Tq11 (for example, 115 kgm which corresponds to the maximum distributed amount at which a ratio of the driving force distributed amounts to the front and rear wheels is 50:50) in a region where the front and rear wheel speed difference ΔVW is positive and not lower than a positive predetermined threshold value (+ΔVW1). In this region where the front and rear wheel speed difference ΔVW is between the predetermined threshold value (+ΔVW1) and "0", the first front wheel distributed torque Tq1 linearly increases with an increase of the front and rear wheel speed difference ΔVW, whereas a zone where the first front wheel distributed torque Tq1 becomes "0" is set in a region where the front and rear wheel speed difference ΔVW is between "0" and a negative first predetermined threshold value (−ΔVW1). The first front wheel distributed torque Tq1 is maintained at a relatively low predetermined value Tq12 (for example, about 50 kgm) in a region where the front and rear wheel speed difference ΔVW is not higher than a negative second threshold valve (−ΔVW2) which is lower than the negative first threshold value (−ΔVW1), whereas the first front wheel distributed torque Tq1 linearly increases with a decrease in the front and rear wheel speed difference ΔVW within a region between the negative second predetermined threshold value (−ΔVW2) and "0".

Figure 6:
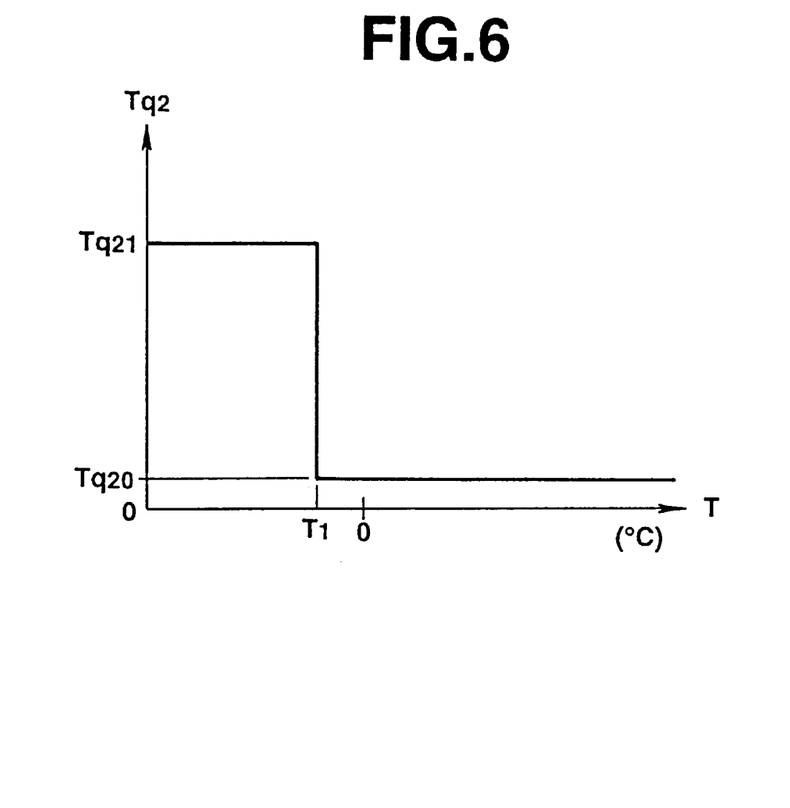
FIG. 6 is a graph of a control map for calculating and setting a second front wheel distributed torque used in the processing program of FIG. 4.

Next, the program goes to a step S7 at which a second front wheel distributed torque Tq2 is calculated and set from a control map shown in FIG. 6 by using the fluid temperature T which has been read at the step S2. According to the control map of FIG. 6, the second front wheel distributed torque Tq2 is maintained at a low predetermined value Tq20 (for example, 2 to 4 kgm) within a normal operating temperature region where the fluid temperature T is not lower than a predetermined threshold value T1 (for example, −10° C.) lower than no "0° C.", whereas the second front wheel distributed torque Tq2 is maintained at a high predetermined value Tq21 (for example, about 60 kgm) within a low operating temperature region where the fluid temperature T is lower than the above-mentioned predetermined threshold value T1.

Then, the program goes to a step S8, judgment is made as to whether the front wheel speed (auxiliary driving wheel speed) VWF read at the step S1 corresponds to a vehicle speed not higher than a predetermined vehicle speed VCO (for example, 20 km/h) or not. It will be understood that the front wheel speed VWF corresponds or is equivalent to the vehicle speed. In case that front wheel speed VWF corresponds to a vehicle speed not higher than the predetermined vehicle speed VCO, the program goes to a step S9. In case that the front wheel speed VWF corresponds to a vehicle speed higher than the predetermined vehicle speed VCO, the program goes to a step S10.

Figure 7:
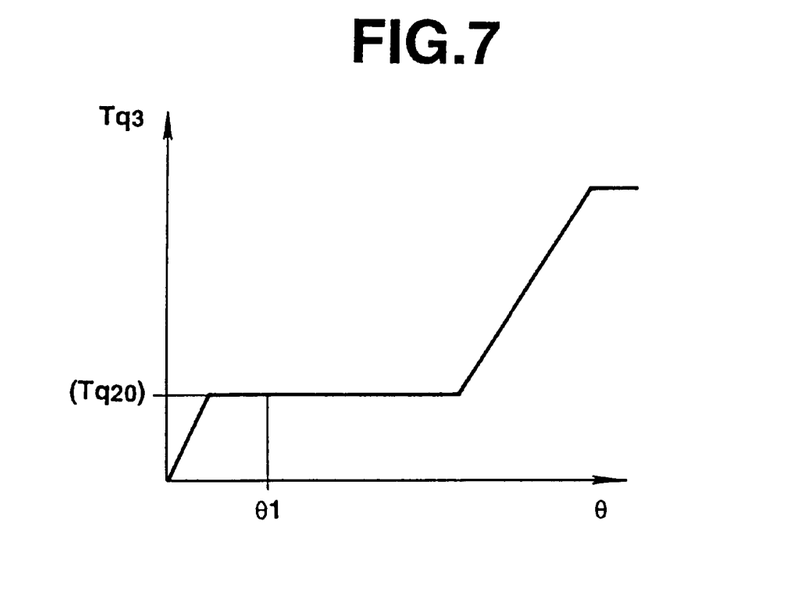
FIG. 7 is a graph of a control map for calculating and setting a third front wheel distributed torque used in the processing program of FIG. 4.

At the step S9, the third front wheel distributed torque Tq3 is calculated and set from a control map shown in FIG. 7 by using the throttle opening degree θ which has been read at the step S3. Then, the program goes to a step S11. According to the control map of FIG. 7, the third front wheel distributed torque Tq3 increases when the throttle opening degree θ is relatively high, whereas the high third front wheel distributed torque Tq3 decreases when the throttle opening degree θ is relatively low. It is to be noted that the third front wheel distributed torque Tq3 which becomes constant at a throttle opening degree θ1 obtained immediately after the depression of the accelerator pedal is set higher than the low predetermined value Tq20 of the second front wheel distributed torque Tq2 in the control map shown in FIG. 6.

At the step S10, the third front wheel distributed torque Tq3 is set at "0" and then the program goes to a step S13.

At the step S11, judgment is made as to whether the front and rear wheel speed difference ΔVW is a negative value (ΔVW<0) or not. In case that the front and rear wheel speed difference ΔVW is a negative value, the program goes to a step S12. In case that the difference ΔVW is "0" or a positive value (ΔVW≧0), the program goes to a step S13.

At the step S13, the highest value is selected from the first front wheel distributed torque Tq1 set at the step S6, the second front wheel distributed torque Tq2 set at the step S7 and the third front wheel distributed torque Tq3 set at the step S9, S10 or S12, according to Eq. (3) mentioned below. The selected highest value is set as a standard front distributed torque TB.

$$TB = MAX(Tq1, Tq2, Tq3) \tag{3}$$

where MAX represents selection of the maximum value.

Then, the program goes to a step S14 at which judgment is made as to whether the four-wheel automatic driving mode select signal S4 is at the ON state of the logic value "1" or not. In case that the four-wheel automatic driving mode select signal S4 is at the ON state, the program goes to a step S15. In case of being not, the program goes to a step S16.

At the step S16, judgment is made as to whether the two-wheel driving mode select switch S2 is at the ON state or not. In case that the two-wheel cruising mode select signal S2 is at the ON state, the program goes to a step S17. In case of being not, the program goes to the step S15. At the step S15, the standard front wheel distributed torque TB calculated at the step S13 is set as a standard front wheel distributed torque Tq. This standard front wheel distributed torque Tq is renewed and stored in the memory 70c, and then the program returns to a main program (not shown).

At the step S17, "0" is set to the standard front wheel distributed torque Tq. This value Tq is renewed and stored in the memory 70c, and then the program returns to the main program.

Next, operation of the four-wheel drive control system C of this embodiment will be discussed. In this embodiment, the fluid pressure control system of the driving force distribution control system 4 is independently provided in the vehicle of this embodiment, in which a line pressure is automatically controlled at a constant level or generally constant level.

First, during a normal cruising of the vehicle, the front and rear wheel speed difference ΔVW is generated between the front and rear wheel speeds VWF, VWR read at the step S1 in the processing-program of FIG. 4. The first front wheel distributed torque Tq1 is calculated and set at the step S6 of FIG. 4. The control map for calculating the first front wheel distributed torque Tq1 used at the step S6 is shown in FIG. 5. The formula of the front and rear wheel speed difference ΔVW serving as the variable is a value obtained by subtracting the auxiliary driving wheel speed (the front wheel speed VWF) from the main driving wheel speed (the rear wheel speed VWR) and therefore the rear wheels 2RL, 2RR as the main driving wheels exhibit a condition of making a slippage owing to the fact that the speed of the rear wheels 2RL, 2RR as the main driving wheels is over the vehicle speed under a low μ (friction coefficient) of a road surface, a sudden acceleration and/or the like in case that the front and rear wheel speed difference ΔVW is a positive value. As this positive front and rear wheel speed difference ΔVW as a slip amount becomes larger, a cruising or running stability, including understeer characteristics, is improved by increasing the driving force applied to the front wheels as the auxiliary driving wheels. Accordingly, the first front wheel distributed torque Tq1 is smoothly increased with an increase in the front and rear wheel speed difference ΔVW when the front and rear wheel speed difference ΔVW is a positive value between "0" and the positive predetermined threshold value +ΔVW1. As a result, the ratio of the driving force distributed amounts to front and rear wheels becomes, for example, 50:50 within the region in which the front and rear wheel speed difference ΔVW is not lower than the positive predetermined threshold value (+ΔVW1), so that the four-wheels are brought into their direct-connection state, thereby improving the cruising stability to the maximum level.

If the front and rear wheel speed difference ΔVW is a negative value during normal cruising of the vehicle, the following two conditions may be occurring: (1) Locked wheel state or locked wheel tendency. Here, the speed of the rear wheels 2RL, 2RR (as the main driving wheels) is smaller than the vehicle speed due to an engine brake force and/or a wheel cylinder force, which occurs when the driver releases the accelerator pedal or presses the brake pedal. The engine brake force and/or the wheel cylinder force may cause a locked wheel state or a locked wheel tendency (in which a real rear wheel braking force, due to the wheel cylinder force, is repeatedly adjusted so that the rear wheels exhibit a locked wheel tendency generally simultaneously with the front wheels under the action of a proportional value, i.e., anti-lock braking). (2) Turning-running state. Here, when the vehicle makes a turn at a radius of turn smaller than a certain degree on a high $\mu$ road surface, the front wheels rotate at a higher speed than the rear wheels, which have a smaller radius of turn than the front wheels, resulting in a turning-running state (the vehicle runs while turning).

In short, a negative front and rear wheel speed difference ΔVW represents the locked wheel state, the locked wheel tendency, and the turning-running state. As the negative value of the front and rear wheel speed difference ΔVW becomes smaller, the driving force applied to the front wheel (as the auxiliary driving wheel) is increased, thereby improving running stability in connection with a steering effect and the understeer characteristics.

However it is to be noted that, when the driving force to the rear wheels is relatively decreased by increasing the driving force to the front wheels, and when the locked wheel tendency in the rear wheels is low, the rear wheels further fall to the locked wheel tendency according to the idea of a so-called friction circle.

Additionally, when making a small turn at a low vehicle running speed, so that the absolute rotational speed of the rear wheels (as the main driving wheels) is small, the front and rear wheel speed difference ΔVW has more than a de minimis negative value. Under such a condition, if the engaging force of the above-mentioned clutch mechanism 37 is increased to increase the driving force to the front wheels, the rotational speed difference between the front and rear wheels cannot be absorbed, thereby producing a so-called tight corner brake phenomenon in which interlock is applied.

In view of this tight corner brake phenomenon, as shown in the control map of FIG. 5, when the front and rear wheel speed difference ΔVW is between "0" and the negative first predetermined threshold value (−ΔVW1), the first front wheel distributed torque Tq1 is kept "0". Moreover, when the front and rear wheel speed difference ΔVW has a larger negative value and is between the negative first predetermined threshold value (−ΔVW1) and the negative second predetermined threshold value (−ΔVW2), the first front wheel distributed torque Tq1 is smoothly increased. The first front wheel distributed torque Tq1, and hence the ratio of the front wheel driving force distributed amount, is increased only up to a certain value (more specifically, so as to obtain a front wheel driving force which is about ¼ of that of the rear wheel), thereby suitably improving the running stability in connection with the understeer characteristics. This maximum certain value of Tq1 is reached when the front and rear wheel speed difference ΔVW has a larger negative value than the negative second predetermined threshold value (−ΔVW2), as shown in FIG. 5. The control map of FIG. 5 prevents the locked wheel tendency in the rear wheels from increasing and the tight corner braking phenomenon from occurring.

Next, according to the processing program of FIG. 4, at the step S7, the second front wheel distributed torque Tq2 is calculated and set from the fluid temperature T which is detected by the fluid temperature sensor 51 and read at the step S2. As is known, hydraulic fluid to be used in a normal fluid pressure control system becomes too high in viscosity in a low temperature operating condition in which the temperature is considerably below "0° C.", and therefore there is such a tendency that the dynamic characteristics of actuators change in such a low temperature operating condition. There is such a fear that a predetermined hydraulic fluid pressure is not supplied to the clutch mechanism 37 in accordance with the duty ratio to the pressure control valve 50 in the four-wheel driving control system of this embodiment. As a result, the ratio of the driving force distributed amounts to the front and rear wheels cannot be brought into coincidence with a target value thereby arising a malfunction of the fluid pressure control system. Additionally, a road surface tends to be frozen or be high in possibility of being covered with snow under snow fall in the low temperature operating condition in which the temperature is considerably below "0° C.". Therefore, according to the control map of FIG. 6, within the range of the hydraulic fluid temperature not lower than the predetermined threshold value T1 which is below 0° C., the first front wheel distributed torque Tq2 is raised to the large predetermined value Tq21 corresponding to a so-called four-wheel direct-connection state in which the ratio of the front and rear wheel driving force distributed amounts is 50:50 thereby preventing the malfunction of the fluid pressure control system while dispersing the driving force to four wheels thereby improving the running stability in connection with the understeer characteristics. The second front wheel distributed torque Tq2 set in such a low temperature operating condition is suitably set in accordance with a temperature characteristics of the hydraulic fluid and a temperature characteristics of the fluid pressure control system. While the second front wheel distributed torque Tq2 has been described as being constant within the temperature region of not higher than the certain threshold value, it may be divided to a plurality of steps, or may be continuously changed according to a certain characteristics.

In a normal temperature operating condition other than the above-mentioned low temperature operating condition, during a driving force distribution control to the front and rear wheels, if the duty ratio to be applied to the pressured control valve 50 is, for example, set "0"% in order to transmit the driving force only to the rear wheels as the main driving wheels, the friction plate 37b and the friction disc 37d of the clutch mechanism 37 are completely separated from each other, in connection with the fact that the driving force distribution control system of this embodiment includes the clutch mechanism. Under such a condition, when the friction plate 37b and the friction disc 37d begin to come into contact with each other so as to pass through a condition in which the engaging force becomes generally "0" and reach a state in which a command signal to increase the engaging force of the clutch mechanism is output, there arise the following possibilities: Discontinuous points are generated in change (with time) of the driving force applied to the front wheels; response delay is produced in driving force distribution control for the front wheels in accordance with a response time at which the friction plates and discs of the clutch mechanism 37 begin to contact to each other; and additionally, the clutch mechanism 37 generates an impact owing to the fact that the engagement of the friction plates and discs is made for a short period of time. According to the control map of FIG. 6, the above-mentioned small predetermined value Tq20 is set as the initial torque of the second front wheel distributed torque Tq2 within the region of the fluid temperature T of not lower than the predetermined threshold value T1 in order to prevent the above-discussed possibilities of the response delay, the impact generation and the like, in which the small predetermined value Tq20 establishes the light contact in the clutch mechanism 37 to such an extent that no driving force is developed in the front wheels.

Subsequently, according to the processing program of FIG. 4, the third front wheel distributed torque Tq3 is calculated and set at the step S9 or the step S10 from the throttle opening degree θ read at the step S3. Almost all known driving force distribution controls to front and rear wheels are feedback controls based on the front and rear wheel speed difference ΔVW which is actually developed, like the first front wheel distributed torque Tq1, and therefore the following response relays are produced between a first time at which the engaging force of the clutch mechanism 37 changes and a second time at which the driving force of the front and rear-wheels 2FL, 2FR is transmitted to the road surface. One of them is a response delay produced owing to the fact that the power output of the engine is transmitted to the front wheels 2FL, 2FR against a rotational inertia of the front wheel-side driving system including the front wheel-side power output shaft 16, the front differential 18 and the front wheel-side drive shaft 20, and the front wheels 2FL, 2FR themselves. Another one is a response delay produced before the front wheels 2FL, 2FR are rotated after the front tires grip the road surface. In the feedback control system of the front and rear wheel speed difference ΔVW, the response delay is predominant particularly under a condition in which slippage of the rear wheels 2RL, 2RR highly tend to occur, for example, at starting of the vehicle on the low μ road surface, thereby providing the possibility of degrading a convergence of the feedback.

In view of this, according to the processing program of FIG. 4, when the front wheel speed VWF which can be considered to be equivalent or generally equivalent to the vehicle speed upon the judgment of the step S8 is within the range of not higher than the predetermined vehicle speed VC0, judgment is made such that the starting of the vehicle is been made at the present time, and then the program goes to the step S9. Here, a slippage amount generated in the rear wheels 2RL, 2RR, an engine power output and the throttle opening degree are considered in a linear relationship to each other. Of these, the throttle opening degree θ is the earliest in time sequence of the above and detected. In the control map of FIG. 7 used at the step S9 of the same processing program, the third front wheel distributed torque Tq3 is increased with an increase in the throttle opening degree q so as to form a component of a feedforward control, thus setting the third front wheel distributed torque Tq3 having this feedforward control component. When this third front wheel distributed torque Tq3 is set to the final target front wheel distributed torque TB, the above-mentioned excessive slippage of the rear wheels 2RL, 2RR at the vehicle starting can be previously prevented, or the convergence of the generated slippage can be raised thereafter. In this embodiment, within the range of the front wheel speed VWF higher than the predetermined vehicle speed VC0, the judgment is made such that the vehicle starting is being not made at the present time, and then the program goes to the step S10 at which the third front wheel distributed torque Tq3 is set at "0" so that the above-mentioned feedforward control at the vehicle starting is compulsorily terminated. The control map of the third front wheel distributed torque Tq3 is not limited to that in this embodiment, in which the third front wheel distributed torque Tq3 may be suitably set in accordance with an engine power output characteristics and a characteristics of the slippage amount generated in the rear wheels, even in case that the throttle opening degree θ is set as the control input as same as in the control map of FIG. 7. Additionally, in this embodiment, when the throttle opening degree θ corresponding to the state in which the acceleration pedal is depressed to a certain extent is the predetermined value θ1, the second front distributed torque Tq2 which is set at the above-mentioned normal temperature operating condition takes the above-mentioned small predetermined value Tq20.

When the vehicle makes its turning-running (the vehicle runs while turning) immediately after its starting on the high μ road surface, the engaging force in the clutch mechanism 37 is too high, thereby making it impossible to absorb the rotational speed difference between the front and rear wheels, which difference is owing to the fact that the front wheel (having a larger radius of turn than that of the rear wheel) rotates at a higher speed than that of the rear wheel. This will apply the interlock to the wheels, thereby developing the tight corner brake phenomena.

In view of this, according to the processing program of FIG. 4, at the step S11, the judgment is made as to whether the front and rear wheel speed difference ΔVW is a negative value (ΔVW<0) or not. In case that the front and rear wheel speed difference ΔVW is negative, it is judged that the turning-running is being made at the present time, and then the program goes to the step S12 at which the third front wheel distributed torque Tq3 is again set at "0". By this, even if the vehicle makes the turning-running immediately after the starting on the high μ road surface, the engaging force in the clutch mechanism 37 becomes generally zero under the effect of the third front wheel distributed torque Tq3 being set at "0", thereby avoiding occurrence of the tight corner brake phenomena. In case that the front and rear wheel speed difference ΔVW is the positive value not lower than "0" at the step S11, the judgment is made such the vehicle is not making the turning-running, and therefore the third front wheel distributed torque Tq3 is not reset.

Next, at the step S13 in the processing program of FIG. 4, the maximum value of the first to third front distributed torques Tq1, Tq2, Tq3 is selected as the standard front wheel distributed torque TB which serves as the standard value of the final target distributed torque Tq discussed after. The reason why such a selection is made is set forth below. The respective front wheel distributed torques Tq1, Tq2, Tq3 discussed before are set independently in accordance with running conditions of the vehicle, driver's operational or driving inputs and the like, and additionally the respective front wheel distributed torques Tq1, Tq2, Tq3 are commonly intended to improve the running stability of the vehicle. Therefore, the maximum value of one (the most contributing to the running stability of the vehicle) of the front wheel distributed torques Tq1, Tq2, Tq3 is selected as the standard front wheel distributed torque TB, without taking account of increasing the ratio of any one of the front wheel distributed torques.

Subsequently, at the steps of S14 to S17 in the processing program of FIG. 4, the target front wheel distributed torque Tq is calculated and set in conformity with the above-mentioned mode select signals S4, S2. More specifically, the vehicle running on the respective front wheel distributed torques Tq1, Tq2, Tq3 set as mentioned above is to be carried out when the driver intentionally selects the four-wheel automatic driving mode upon expecting the optimum four-wheel driving condition in accordance with the vehicle running condition and the driver's operational inputs. Accordingly, when the two-wheel running mode is selected, the running condition of the vehicle is naturally to be created in accordance with the driver's will upon respecting the driver's will. Accordingly, when the four-wheel automatic driving mode is selected, the program goes from the step S14 to the step S15, so that the standard front wheel distributed torque TB (as it is) is calculated and output as the target front wheel distributed torque Tq. Additionally, when the two-wheel driving mode is selected, the program goes from the step S14 to the steps S16 and S17, so that the target front wheel distributed torque Tq is calculated and output as "0".

Accordingly, in this embodiment, in case that the rear wheels 2RL, 2RR as the main driving wheels make the slippage upon their rotational speed being over the vehicle speed during the normal running (for example, running at a vehicle speed over 20 Km/h) under selection of the four-wheel driving mode of the vehicle, the front and rear wheel speed difference $\Delta VW$ ($\Delta VW=VWR-VWF$) becomes a positive value so that the target front wheel distributed torque Tq is smoothly increased with reference to the control map of FIG. 5, in which the distributed driving force amount to the front wheels as the auxiliary driving wheels is increased so that the ratio of the front and rear wheel driving force amounts reaches 50:50, thereby raising the vehicle running stability in connection with the understeer characteristics to the maximum level.

When the turning-running is made on a high $\mu$ road surface upon making the normal running, the front wheel speed VWF becomes higher than the rear wheel speed VWR so that the front and rear wheel speed difference $\Delta VW$ takes a negative value. Therefore, the target front wheel distributed torque Tq is set at "0" with reference to the control map of FIG. 5, so that the distributed driving force to the front wheels (the auxiliary driving wheels) is made generally zero, thereby avoiding the tight corner brake phenomena during the turning-running.

Under the normal temperature operating condition in connection with the temperature T of the hydraulic fluid within the reservoir 35b, the small target front wheel distributed torque Tq is set as an initial torque so as to make a light contact of the plates and discs in the clutch mechanism 37 with reference to the control map of FIG. 6, thereby preventing the response delay and the impact generation in the driving force distribution control to the front wheels.

When the vehicle starts on a low $\mu$ road surface upon selecting the four-wheel automatic driving mode, judgment of the vehicle speed (the front wheel speed VWF) being not higher than the predetermined vehicle speed VC0 (for example, 20 km/h) is made, and thereafter the target front wheel distributed torque Tq is set in accordance with a signal representative of the throttle opening degree which signal is the earliest in time sequence relative to other vehicle running condition detection signals representative of the front wheel speed VWF, the rear wheel speed VWR and the like with reference to the control map shown in FIG. 7. This previously prevents an excessive slippage of the rear wheels from occurring at the vehicle starting and raises the convergence of the slippage which has occurred.

Further, when the vehicle makes the turning-running immediately after its starting on the high $\mu$ road surface upon selecting the four-wheel automatic driving mode, the judgment of the vehicle speed (the front wheel speed VWF) being not higher than the predetermined vehicle speed VC0 (for example, 20 km/h) is made, and additionally the judgment of the front and rear wheel speed difference $\Delta VW$ being negative is made owing to the fact that the front wheel speed VWF is over the rear wheel speed VWR; and thereafter, the target front wheel distributed torque Tq is set at "0". Then, the second front wheel distributed torque Tq2 or the initial torque becomes the maximum value of the first to third front wheel distributed torques Tq1, Tq2, Tq3, so that this initial torque becomes the distributed driving force to the front wheels (the auxiliary driving wheels).

As a result, even if the vehicle makes the turning-running immediately after the vehicle starting on the high $\mu$ road surface, the engaging force of the clutch mechanism 37 is kept at such a degree that the rotational speed difference generated between the front and rear wheels can be absorbed, and therefore the tight corner brake phenomena can be prevented from arising.

Furthermore, according to this embodiment, the judgment of the vehicle running has been changed into the turning-running can be accomplished by judging as to whether the front and rear wheel speed difference $\Delta VW$ is negative ($\Delta VW<0$) or not, thereby realizing a simple processing program.

As discussed above, in the four-wheel drive control system of the present invention, the clutch mechanism 37, the pressure source 35 and the pressure control valve 50 correspond to the driving force distribution adjusting device. The front and rear wheel speed sensors 54, 56, the steps S1 and the steps S5 of the processing program of FIG. 4 correspond to the rotational speed difference detecting means. The step S3 of the processing program of FIG. 4 corresponds to the throttle opening degree detecting means. The step S8 of the processing program of FIG. 4 corresponds to the vehicle running condition judging means. The steps S11 and S12 of the processing program of FIG. 4 correspond to the second driving force distributed amounts adjusting device. The whole processing program of FIG. 4 corresponds to the driving force distribution control system.

While only the four-wheel drive vehicle based on a rear drive type one has been shown and described, it will be understood that the principle of the present invention may be applied to a four-wheel drive vehicle based on a front drive type one and including a clutch mechanism of a transfer so that control is made on the clutch mechanism.

Although the fluid pressure operated type multiple disc clutch mechanism 37 has been shown and described as the clutch mechanism or friction clutch in the embodiment, it will be appreciated that any clutch mechanisms which can continuously distribute a driving force may be used in place of the multiple disc clutch mechanism, in which an example of such clutch mechanism is an electromagnetic clutch.

While the rotational speed of the auxiliary driving wheels have been described as being used to evaluate the vehicle speed in the embodiment, it will be understood that a suitable filtering treatment is applied to the rotational speed of the auxiliary driving wheels in order to prevent the vehicle speed from being affected by a varying rotational speed of the auxiliary driving wheels due to a varying driving force to be applied to the auxiliary driving wheels; or a false vehicle speed (estimated vehicle speed) used in known anti-skid control may be employed in place of the rotational speed of the auxiliary driving wheel.

While the control unit 58 has been shown and described as including the microcomputer, it will be appreciated that the control unit 58 may include combined electronic circuits such as counters and comparators in place of the microcomputer.

It will be understood that the hydraulic fluid is one of oil, water and the like. Additionally, the hydraulic fluid may be replaced with gas such as air. While the pump 35c has been shown and described as being driven by the electric motor 35a, it will be understood that the pump 35c may be driven under the action of the rotational power output of the engine.

As appreciated from the above, according to the four-wheel drive control system of the present invention, in case that the vehicle makes its turning-running (the vehicle makes simultaneously its turning and running) immediately after its starting on a high $\mu$ road surface, the second driving force distributed amount adjusting device judges the fact that the rotational speed of the front wheels of the vehicle is over that of the rear wheels, and sets smaller the driving force distributed amount (set according to the detected value of the throttle opening degree) of the second driving force distributed amounts to be applied to the auxiliary driving wheels, than that set when the rotational speed of the rear wheels is over that of the front wheels. As a result, the engaging force of the friction clutch is controlled to such an extent as to absorb the rotational speed difference developed between the front and rear wheels, thereby preventing the tight corner brake phenomena from occurring.

Additionally, when the vehicle starts on the low $\mu$ road surface, the driving force distributed amount to the auxiliary wheels is set according to the feedforward control based on the detected value of the throttle opening degree detected by the throttle opening degree detecting device, thereby suppressing occurrence of slippage of the main driving wheels thus improving the starting characteristics of the vehicle. As a result, the present invention can realize both preventing the tight corner brake phenomena due to turning immediately after the starting on the high $\mu$ road surface and improving the starting characteristics on the low $\mu$ road surface.

What is claimed is:

1. A four-wheel drive control system for a vehicle having main driving wheels and auxiliary driving wheels, the main driving wheels being one of front and rear wheels, the auxiliary driving wheels being the other of rear and front wheels, said control system comprising:

driving force distribution adjusting means including a friction clutch for distributing a driving force to the main driving wheels and the auxiliary driving wheels under a control of an engaging force of the friction clutch;

rotational speed difference detecting means for detecting a difference in rotational speed between the main driving wheels and the auxiliary driving wheels;

throttle opening degree detecting means for detecting a throttle opening degree;

vehicle running condition judging means for judging starting of the vehicle;

driving force distribution control means for (a) setting first driving force distributed amounts respectively to the main and auxiliary driving wheels in accordance with a detected value of the rotational speed difference detected by said rotational speed difference detecting means, in a manner that a driving force to be applied to the auxiliary driving wheels increases with an increase in the detected value of the rotational speed difference, (b) when said vehicle running condition judging means judges the vehicle to be at the starting condition, setting second driving force distributed amounts respectively to the main and auxiliary driving wheels in accordance with a detected value of the throttle opening degree detected by said throttle opening degree detecting means, and (c) controlling the engaging force of the friction clutch of said driving force distribution adjusting means in accordance with the first and second driving force distributed amounts;

wherein said driving force distribution control means includes second driving force distributed amounts adjusting means, and wherein, when said vehicle running condition judging means judges the vehicle to be at the starting condition and when the rotational speed of the auxiliary driving wheels is over that of the main driving wheels, said second driving force distributed amounts adjusting means reduces the second driving force distributed amounts to the auxiliary driving wheels.

2. A four-wheel driving control system as claimed in claim 1, wherein said second driving force distributed amounts adjusting means includes state judging means for judging one of a first state where the rotational speed of the front wheels is over that of the rear wheels and a second state where the rotational speed of the rear wheels is over that of the front wheels, in accordance with one of positive and negative values in the rotational speed difference.

3. A four-wheel driving control system as claimed in claim 1, wherein said driving force distribution adjusting means includes a transfer having the friction clutch which is formed around a power output shaft connected to the main driving wheels, the driving force from the power output shaft being capable of being transmitted through the friction clutch to the auxiliary wheels.

4. A four-wheel driving control system as claimed in claim 1, wherein the friction clutch of the driving force distribution adjusting means is a pressure-responsive type, wherein said driving force distribution control means includes a pressure control valve for controlling a pressure to be applied to the friction clutch to control the engaging force, said pressure control valve being operative in accordance with the first and second driving force distributed amounts.

5. A four-wheel driving control system as claimed in claim 4, wherein said pressure control valve is of a duty ratio proportional type so that a pressure from said pressure control valve is proportional to a duty ratio of a voltage signal.

6. A four-wheel driving control system as claimed in claim 4, wherein said driving force distribution control means includes a microcomputer which is adapted to output the voltage signal to said pressure control valve, the voltage signal being changed in accordance with the rotational speed difference detected by said rotational speed difference detecting means, the throttle opening degree detected by said throttle opening degree detecting means, and the starting of the vehicle judged by said vehicle running condition judging means.

7. A four-wheel drive control system for a vehicle having main driving wheels and auxiliary driving wheels, the main driving wheels being one of front and rear wheels, the auxiliary driving wheels being the other of rear and front wheels, said control system comprising:

driving force distribution adjusting means including a friction clutch for distributing a driving force to the main driving wheels and the auxiliary driving wheels under a control of an engaging force of the friction clutch;

rotational speed difference detecting means for detecting a difference in rotational speed between the main driving wheels and the auxiliary driving wheels;

throttle opening degree detecting means for detecting a throttle opening degree;

vehicle running condition judging means for judging a starting condition of the vehicle; and     driving force distribution control means for controlling the engaging force of said driving force distribution adjusting means, said driving force distribution control means including         means for setting first driving force distributed amounts respectively to the main and auxiliary driving wheels in accordance with a detected value of the rotational steed difference detected by said rotational speed difference detecting means, in a manner that a driving force to be applied to the auxiliary driving wheels increases with an increase in the detected value of the rotational speed difference,     means for setting second driving force distributed amounts respectively to the main and auxiliary driving wheels in accordance with a detected value of the throttle opening degree detected by said throttle opening degree detecting means when a judgment is made that the vehicle is at the starting condition by said vehicle running condition judging means,     means for controlling the engaging force of the friction clutch of said driving force distribution adjusting means in accordance with the first and second driving force distributed amounts, and     means for reducing the second driving force distributed amounts to the auxiliary driving wheels when the rotational speed of the auxiliary driving wheels is over that of the main driving wheels and when said vehicle running condition judging means judges that the vehicle is in the starting condition.

\* \* \* \* \*